United States Patent Office 3,092,450
Patented June 4, 1963

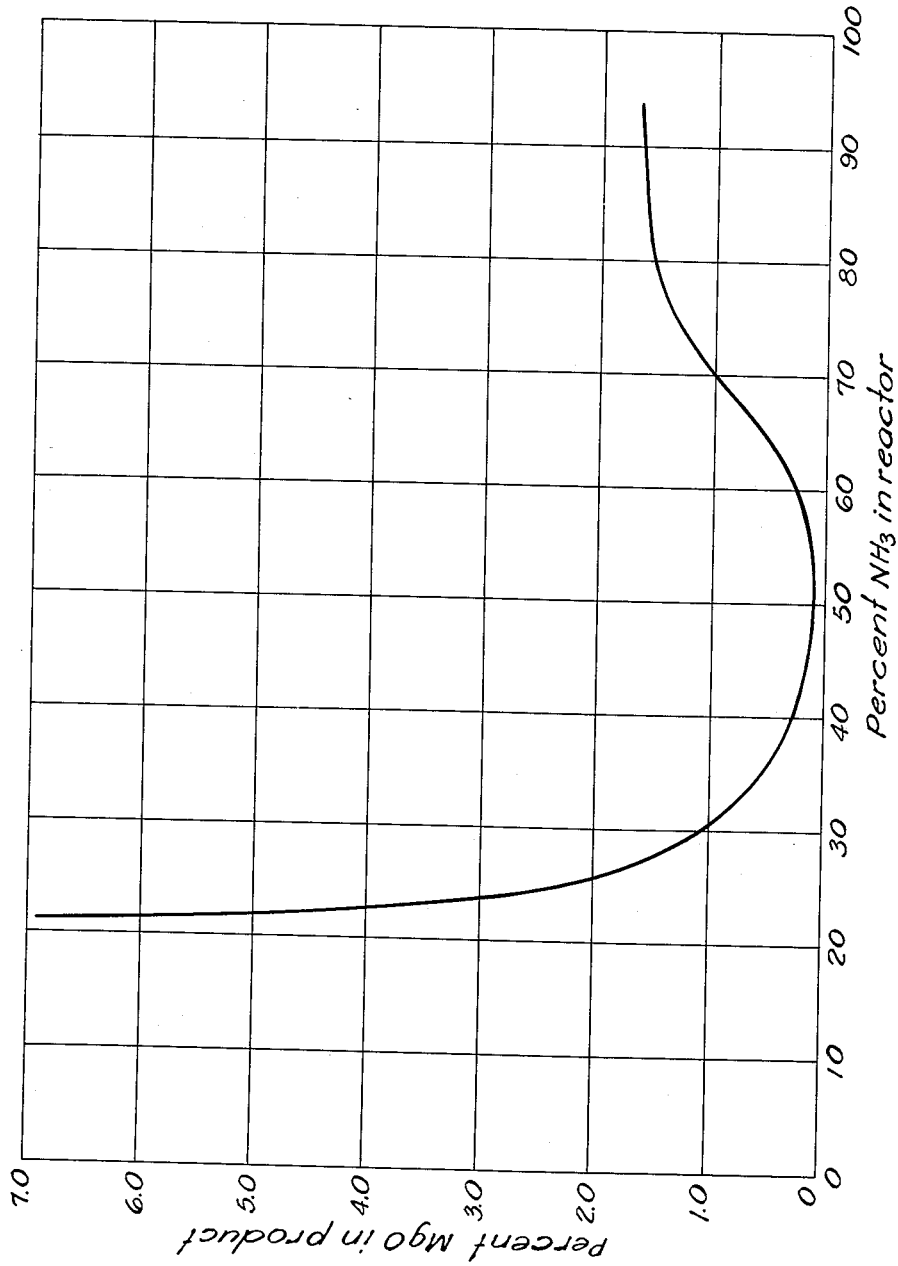

3,092,450
PREPARATION OF ANHYDROUS MAGNESIUM CHLORIDE
Valdemar J. Christensen, Pasadena, Calif., and Granville C. Egleson and Elwood L. Carlson, Lake Jackson, Tex., assignors to The Dow Chemical Company, Midland, Mich., a corporation of Delaware
Filed Dec. 27, 1960, Ser. No. 78,721
7 Claims. (Cl. 23—91)

This invention relates to an improved process for the preparation of anhydrous magnesium chloride, and more particularly, to the preparation of anhydrous magnesium chloride by the precipitation of the magnesium chloride as a hexammoniate under controlled conditions.

Various methods for the production of anhydrous magnesium chloride have been disclosed. By most of the methods, the product obtained is only substantially anhydrous containing from 95 to 97 percent magnesium chloride and the remainder being magnesium hydroxide or magnesium oxide and water. A high percentage of the magnesium chloride is used in the production of magnesium metal by electrolysis. When the magnesium chloride is used in an electrolytic cell, an electrolyte must be added to the magnesium chloride to increase the conductivity of the bath. With many of these electrolytes an anhydrous magnesium chloride is desirable, but it is not essential. A salt containing from 95 to 97 percent magnesium chloride as obtained from most of the prior art processes is entirely satisfactory. New electrolytic baths have been recently discovered which will greatly increase the efficiency of these electrolytic cells. With these new baths, a high purity anhydrous magnesium chloride is required. The presence of over 0.5 weight percent of magnesium oxide or magnesium hydroxide will considerably increase the sludging and result in a low efficiency. Thus, in order to obtain the high efficiency with these new electrolytes, it is essential that a grade of anhydrous magnesium chloride be made containing at least 99.5 weight percent of magnesium chloride.

In British Patent No. 330,650, a process is disclosed whereby a magnesium chloride hexammoniate is precipitated from a solution of magnesium chloride and ammonium chloride by the addition of ammonia to the solution. This hexammoniate is recovered and heated to drive off the ammonia. While by this process a good grade of anhydrous magnesium chloride can be made, it is impossible to make an acceptable product for the new electrolytes. In the precipitation of the hexammoniate, hydrolysis of the magnesium chloride occurs, forming magnesium hydroxide which is carried down with the precipitate.

It is, therefore, among the objects of this invention to provide a process for the preparation of anhydrous magnesium chloride where a product containing at least 99.5 weight percent of magnesium chloride is obtained.

The above and other objects can be attained according to the invention by adding magnesium chloride to an aqueous solution containing from 35 to 65 weight percent ammonia to react the magnesium chloride with the ammonia to form the magnesium chloride hexammoniate. By forming and precipitating the magnesium hexammoniate from solutions having the limited concentration of ammonia an anhydrous magnesium chloride product containing up to 99.8 percent magnesium chloride may be obtained. By adding the magnesium chloride to the ammonia solution, the magnesium chloride hexammoniate is immediately formed and precipitates out without the concentration of the magnesium chloride in the solution increasing to a level where hydrolysis may readily occur.

In the prior art, the precipitation was carried out by adding ammonia to a solution of magnesium chloride and ammonium chloride. By adding the ammonia to the solution, the solution initially contains a high concentration of magnesium chloride which results in a large amount of the magnesium chloride hydrolyzing and the magnesium hydroxide thus formed being incorporated in the precipitate. At the end of the precipitation when the ammonia concentration is increased and the ammonium chloride concentration decreased by the precipitation of the hexammoniate, more desirable conditions are obtained. However, since the product obtained towards the end of the precipitation cannot be separated from product obtained at the beginning of the reaction, the total product of the hexammoniate obtained will contain a relatively high percentage of magnesium hydroxide. When the product is calcined to remove the ammonia, the magnesium hydroxide is converted to magnesium oxide and contains a concentration of magnesium oxide above that which is desirable for use with the new electrolytes. FIGURE 1 illustrates the effect of the ammonia concentration on the amount of magnesium oxide obtained in the calcined product.

To obtain the plot shown in the drawing, a series of runs was made with a continuous reactor. An aqueous solution of magnesium chloride and ammonia were continually charged to the reactor where the magnesium chloride was reacted with the ammonia to form the magnesium chloride hexammoniate. The precipitated hexammoniate thus obtained was washed with ammonia and then calcined at 400° C. to drive off the ammonia. The calcined product was then analyzed to determine the magnesium oxide that it contained. In each run the rate at which the ammonia was fed to the reactor was changed so that the reaction of the magnesium chloride with the ammonia was effected in the reactor at different ammonia concentrations. The data and details on which the drawing is based are given below in Example I.

In the drawing the abscissa represents the concentration of ammonia in the reactor in weight percent and the ordinate represents the magnesium oxide content of the solids obtained after calcination. From the plot it may be readily seen that at low concentrations of ammonia, high percentage of magnesium oxide was present in the product. At ammonia concentration of around 21 percent approximately 6.8 percent of the solids was magnesium oxide. As the concentration increased the amount of magnesium oxide obtained in the solid decreased rapidly. A minimum concentration of magnesium oxide was obtained when the ammonia in the reactor was in the range of approximately 35 to 65 weight percent. At concentrations higher than 65 percent the magnesium oxide content again increased rather sharply and leveled off at about 1.5 weight percent. Thus in order to obtain a high purity anhydrous magnesium chloride it is essential that all of the magnesium chloride hexammoniate be precipitated under conditions where the ammonia concentration is from 35 to 65 percent.

In the precipitation of the hexammoniate the presence of a soluble ammonium salt in the solution in addition to the magnesium chloride and ammonia is helpful, but an acceptable product may be obtained without the use of the soluble ammonium salt. The addition of a soluble ammonium salt is beneficial in two respects. It decreases the solubility of the magnesium chloride hexammoniate and thus increases the yield and also represses to a limited extent the hydrolysis of the magnesium chloride to magnesium hydroxide. Generally the amount of the ammonium salt, when used, varies with the temperature at which the precipitation is carried out. At low temperatures, 10° C. or below, as little as 1 weight percent of the salt may be beneficial. The concentration may be increased, especially at higher temperatures, since the hydrolysis of the magnesium chloride increases appreciably with increase in temperature. A practical maximum concentration of the soluble ammonium salt is about 10 weight percent. Any soluble ammonium salt may be used, but the salts most effective are ammonium chloride, ammonium acetate, and ammonium thiocyanate. Ammonium chloride is preferred, since it is more effective in decreasing the solubility of the magnesium chloride hexammoniate due to the presence of the chloride ion.

In order to obtain an acceptable product, a continuous process is used where all of the precipitation of the hexammoniate is obtained from a solution containing from 35 to 65 weight percent ammonia. Ammonia, magnesium chloride, water, and a soluble ammonium salt, if used, are charged to a reactor at a rate such that the concentrations necessary for the precipitation of the hexammoniate of the desired purity are maintained therein. The reactor may be operated at a temperature in the range of 10° to −20° C. or lower at atmospheric pressure. Under these conditions of temperature and pressure, the constituents are added to the reactor at rate such that the percentage of the constituents in the total feed or the resulting mixture obtained in the reactor contains from 35 to 65 weight percent of ammonia, from 2 to 20 weight percent of magnesium chloride and from 1 to 5 weight percent of soluble ammonium salt when the ammonium salt is used. It is preferred to maintain the solution in the reactor saturated with ammonia which at the above temperature and pressure will normally be obtained when the mixture in the reactor or the total feed to the reactor contains from 39 to 54 weight percent of ammonia. The preferred amount of the magnesium chloride is from 8 to 10 weight percent and 2 to 5 weight percent for the ammonium soluble salt when used. A residence time of from ½ to 1½ hours in the reactor is generally provided.

In the formation of the hexammoniate, the reaction is exothermic so that when operating at low temperatures a large amount of refrigeration is required which is expensive. A high temperature process may also be used where a reaction temperature up to 75° C. is employed and cooling water is used to remove the high percentage of the heater reaction. In this process a pressure reactor must be used in order to maintain a sufficiently concentrated ammonia solution. Since at the higher temperatures the solubility of the hexammoniate is high, the mixture is preferably later cooled to a temperature of from 10° to −20° C. to obtain a higher yield of the product. The refrigeration is used to cool to this low temperature, but the amount required is considerably less, since the heat of reaction has been removed by the cooling water. A reaction temperature in the range of 40° to 75° C., preferably in the range of 45° to 60° C., is generally employed. The concentrations of magnesium chloride maintained in the high temperature reactor is about the same as for the low temperature process. To help to repress the hydrolysis of the magnesium chloride at these high temperatures, a soluble ammonium salt is generally added to the solution. The ammonia concentration maintained in the reactor is from 40 to 60 weight percent, preferably from 50 to 55 weight percent. To maintain the preferred ammonia concentration in the mixture, a pressure in the range of 100 to 120 pounds per square inch is required. In the operation of this process, generally two reactors are used. The constituents are charged to the high temperature reactor where the reaction is carried out and the effluent from this reactor is then passed to a second reactor which is maintained at a temperature in the range of 10° C. to −20° C.

A batch process may be also used, but it is difficult to obtain a high purity product. In order to maintain a relatively low concentration of magnesium chloride and a high concentration of ammonia, it is essential that the magnesium chloride solution be added to a saturated ammonia solution which was not done in the prior art. It is preferred to add a soluble ammonia salt to the ammonia solution prior to the addition of magnesium chloride. This decreases the solubility of the magnesium chloride in the solution and thus the hexammoniate will precipitate at a lower magnesium chloride concentration. When the magnesium chloride is added, it is essential that good agitation of the mixture be maintained so that a localized high concentration of magnesium chloride is not obtained. The danger of obtaining a localized high concentration is minimized if some of the soluble ammonium salt is intermixed with magnesium chloride solution. Even when the above precautions are taken, the ammonia concentration in the solution will decrease as the hexammoniate is formed which will result in a less pure product being formed. Thus, it is difficult to produce a product without continuously adding ammonia to the mixture to make up for the dilution resulting from the addition of magnesium chloride solution and for the removal of the ammonia from the solution by the formation of the hexammoniate. In a continuous process, the addition of magnesium chloride may be made with other reactants so that desired concentrations are maintained for the precipitation of the magnesium chloride hexammoniate.

Various magnesium chloride solutions may be used as feeds to the reactor. A solution containing around 30 to 40 weight percent of magnesium chloride is generally preferred. A more dilute solution may be used, but in order to maintain the required concentration of ammonia in the reactor, a larger amount of ammonia must be added to offset the dilution obtained by the addition of water with the magnesium chloride feed. Magnesium chloride hydrate in solid form may also be used, but this involves handling of solids which is inconvenient.

The following examples further illustrate the invention.

*Example 1*

To show the effect of ammonia concentration on the purity of the anhydrous magnesium chloride obtained, a continuous process using a 2 liter reactor was used. A series of runs was made where a solution containing 24 weight percent magnesium chloride, 4 weight percent ammonium chloride and the remainder water and ammonia were continuously fed to the reactor maintained at −10° C. and a resulting reaction product continuously withdrawn. A residence time of approximately 1 hour was used. The magnesium chloride and ammonium chloride solution was continuously charged at a rate of 806 grams per hour and the amount of ammonia charged to the reactor was varied from run to run so that from 21 to 90 weight percent of the material charged to the reactor was ammonia.

A sample of the slurry obtained in each of the runs was filtered and the crystals of hexammoniate washed twice with liquid ammonia. The washed crystals were then calcined for 4 hours at 400° C. to drive off the ammonia. The anhydrous magnesium chloride product obtained after the calcination was analyzed for percent chloride and magnesium oxide.

The results obtained in each of the runs is shown in the table below.

| Concentration of $NH_3$ in reactor, weight: | MgO in $MgCl_2$ product, weight percent |
|---|---|
| 90 | 1.59 |
| 65 | 0.75 |
| 58 | 0.12 |
| 53 | 0.13 |
| 41 | 0.23 |
| 32 | 0.75 |
| 21 | 6.8 |

Example II

In a pilot plant a 6 gallon agitated reactor was charged with a 16 weight percent magnesium chloride and 4 weight percent ammonium chloride solution continuously at a rate of 7.05 pounds per hour. Ammonia was fed continuously at a rate of 6.28 pounds per hour which gave an ammonia concentration in the reactor of 47 weight percent. The mixture was maintained at a temperature of 0° C. by use of refrigeration. The reactants were introduced under vigorous agitation so that a rapid dispersion of the reactants into the bulk of the mixture was obtained. After 2.25 hours of operation, the withdrawal of a slurry of magnesium chloride hexammoniate at a rate of 13.3 pounds per hour was begun. Thus a steady state was reached with a 2.25 hour residence time being maintained in the reactor. The slurry was filtered, washed with liquid ammonia and calcined for four hours at 400° C.

The anhydrous magnesium chloride thus obtained contained 0.09 weight percent magnesium oxide and around 0.09 weight percent water. An analysis of the filtrate indicated that a yield of around 70 percent per pass was obtained.

Example III

A two stage continuous run was made where water was used to remove the heat of reaction. The first stage reactor was a jacketed tubular reactor which was maintained at a temperature of around 45° C. by passage of water in the jacket and under a pressure of 100 pounds per square inch gauge. The second stage reactor was the same reactor as described in Example I. To the tubular reactor a solution containing 8.3 weight percent magnesium chloride and 11.6 percent ammonium chloride was continuously charged at a rate of 10.6 pounds per hour. Ammonia was also continuously introduced at a rate of 7.1 pounds per hour. A residence time of around 20 seconds was provided in the tubular reactor. From the tubular reactor the contents were introduced into the agitated reactor as described in Example I. With the introduction of the reaction mixture from the tubular reactor to the agitated vessel, an additional 1.7 pounds per hour of ammonia was added. The retention time in the agitated reactor was 1.875 hours and with the addition of the 1.7 pounds per hour of ammonia, the ammonia concentration maintained in the reactor was 45 percent. The agitated reactor was maintained at +3° C. by use of refrigeration.

The magnesium chloride hexammoniate precipitate obtained was processed as described in the previous examples. The anhydrous magnesium chloride product obtained contained 0.13 percent magnesium oxide and a yield of 60 percent per pass was obtained.

What is claimed is:

1. A process for the preparation of anhydrous magnesium chloride which comprises; adding magnesium chloride to an agitated aqueous solution containing not more than 65 weight percent ammonia, maintaining ammonia concentration in the thus formed reaction mixture at from 35 to 65 percent by weight of solution throughout reaction in which magnesium chloride reacts with ammonia to form a precipitate of magnesium chloride hexammoniate, separating the precipitated magnesium chloride hexammoniate from the reaction mixture, and recovering anhydrous magnesium chloride from said hexammoniate.

2. A process for the preparation of anhydrous magnesium chloride which comprises; adding magnesium chloride and a soluble ammonium salt to an agitated aqueous solution containing not more than 65 weight percent ammonia, maintaining the ammonia concentration in the thus formed reaction mixture at from 35 to 65 percent by weight of solution and the temperature at from −20 to +10 degrees centigrade throughout reaction in which magnesium chloride reacts with ammonia to form a precipitate of magnesium chloride hexammoniate, separating the precipitated magnesium chloride hexammoniate from the reaction mixture, and recovering anhydrous magnesium chloride from said hexammoniate.

3. A process according to claim 2 wherein the soluble ammonium salt is ammonium chloride.

4. A continuous process for the preparation of anhydrous magnesium chloride which comprises; continuously charging ammonia, water and magnesium chloride to a reactor at rates such as to intermix the reactants and to form and maintain throughout reaction a mixture in the reactor containing from 35 to 65 percent ammonia by weight of solution and from 2 to 20 percent magnesium chloride by weight of solution, thereby reacting the magnesium chloride and the ammonia at a temperature maintained in the range of from −20 to +10 degrees centigrade to form magnesium chloride hexammoniate precipitate, continuously removing the magnesium chloride hexammoniate precipitate from the reactor and recovering anhydrous magnesium chloride from the magnesium chloride hexammoniate.

5. A continuous process for the preparation of anhydrous magnesium chloride which comprises; continuously charging ammonia, water, magnesium chloride and a soluble ammonium salt to a reactor at rates such as to intermix the reactants and to form and maintain throughout reaction a mixture in the reactor containing from 35 to 65 percent ammonia by weight of solution, from 8 to 10 percent magnesium chloride by weight of solution, and from 2 to 5 percent soluble ammonium salt by weight of solution, thereby reacting the magnesium chloride and ammonia at a temperature maintained in the range of from −20 to +10 degrees centigrade to form magnesium chloride hexammoniate precipitate, continuously removing the magnesium chloride hexammoniate precipitate from the reactor, and recovering anhydrous magnesium chloride from the magnesium chloride hexammoniate.

6. The process according to claim 5 wherein the soluble salt is ammonium chloride.

7. A continuous process for the preparation of anhydrous magnesium chloride which comprises; continuously charging ammonia, water, magnesium chloride and a soluble ammonium salt to a reactor at rates such that in the reactor a liquid mixture will contain throughout reaction, from 40 to 60 percent ammonia by weight of solution, from 3 to 14 percent magnesium chloride by weight of solution, and from 3 to 10 percent of the soluble ammonium salt by weight of solution, thereby reacting the magnesium chloride and ammonia to form magnesium chloride hexammoniate precipitate at a temperature maintained in the range of from 45 to 75 degrees centigrade, continuously withdrawing the mixture of precipitate and liquid from the reactor, cooling the withdrawn mixture to a temperature in the range of −20 to +10 degrees centigrade, separating the magnesium chloride hexammoniate precipitate from the reaction mixture, and recovering anhydrous magnesium chloride from the magnesium chloride hexammoniate.

References Cited in the file of this patent

FOREIGN PATENTS

| | | |
|---|---|---|
| 282,164 | Italy | Feb. 3, 1931 |
| 330,650 | Great Britain | June 16, 1930 |